United States Patent [19]

Sigmund

[11] 3,989,081
[45] Nov. 2, 1976

[54] METHOD AND APPARATUS FOR PRELOADING A JOINT

[75] Inventor: Jerry A. Sigmund, Willow Grove, Pa.

[73] Assignee: Standard Pressed Steel Co., Jenkintown, Pa.

[22] Filed: Dec. 13, 1974

[21] Appl. No.: 532,532

[52] U.S. Cl. .................................. 151/2 R; 85/7; 85/50 R
[51] Int. Cl.² ...................................... F16B 39/02
[58] Field of Search ..................... 85/36, 7, 50 R; 151/2 R

[56] References Cited
UNITED STATES PATENTS

| 1,174,359 | 3/1916 | Shaffer et al. | 85/50 R X |
| 1,512,896 | 10/1924 | Kraft | 85/50 R X |
| 3,203,300 | 8/1965 | Marschner | 85/7 |
| 3,421,562 | 1/1969 | Orloff et al. | 151/2 R |
| 3,655,227 | 4/1972 | Orloff | 151/2 R |
| 3,803,793 | 4/1974 | Dahl | 151/2 R |

FOREIGN PATENTS OR APPLICATIONS

| 608,067 | 4/1926 | France | 151/50 R |
| 677,876 | 6/1939 | Germany | 85/50 R |
| 679,138 | 9/1952 | United Kingdom | 85/50 R |

Primary Examiner—Roy D. Frazier
Assistant Examiner—Thomas J. Holko
Attorney, Agent, or Firm—Andrew L. Ney; Aaron Nerenberg

[57] ABSTRACT

The invention disclosed herein relates to a fastener assembly and method of using same to preload a joint including a plurality of adjacent workpieces having aligned openings formed therein. The fastener assembly includes a pin member having an enlarged head and a shank located within the aligned openings in the workpieces and further includes a collar member having a deformable outer portion and a relatively hard inner portion located about a portion of the shank such that the inner portion is directly adjacent the shank portion. Also formed on the shank is a thread configuration adapted to cooperate with a complimentary thread configuration for snugging the workpieces together with a relatively light preload. After the joint has been snugged together, the collar member is crimped causing axial flow of material in the outer portion which reacts to stretch the pin member and induce a desired preload in the joint. Radial flow of the material in the outer portion is resisted by the hardened inner portion whereby the collar member does not flow into engagement with the shank portion of the pin member.

5 Claims, 10 Drawing Figures

METHOD AND APPARATUS FOR PRELOADING A JOINT

This invention relates to a method and apparatus for preloading a joint and, more particularly, to a fastener assembly including a pin member and a collar member which are tightened in such a way that a relatively accurate preload is developed in the joint.

For certain joints it is desirable to tighten the fastener assemblies to a predetermined preload which is exerted on the workpieces forming the joint and which assures the structural integrity of the joint. One type of fastener assembly and tightening technique for preloading a joint includes the use of a pin member including a head and a shank which is inserted through aligned openings in the workpieces with a portion projecting beyond the outer surface of one of the workpieces and about which is placed a collar member. The shank is formed with a threaded portion which cooperates with a complimentary thread configuration whereby the workpieces can be snugged together with a light preload. Usually, the preload developed when the workpieces are snugged together is sufficient to remove free play in the joint. After the workpieces have been snugged together, the collar member is crimped such that a groove configuration is formed in its outer surface and material is displaced first flowing radially inwardly into engagement with the adjacent shank portion of the pin member. The shank portion resists further radial flow of the displaced collar material which now flows axially causing the shank of the pin member to stretch and exert a preload on the workpieces. Use of the described tightening technique is relatively accurate.

In one form of the fastener assembly usuable in the described tightening technique, the collar member is a nut having the complimentry thread configuration formed in one portion and a counterbore formed in another portion. The threaded portion cooperates with the threaded portion of the shank to snug the workpieces and the counterbored portion is located adjacent a segment of the threaded portion of the shank. When tightening a joint with this form of the fastener assembly, the counterbored portion is crimped and the displaced material flows into intimate engagement with the adjacent segment of the threaded portion of the shank and then axially to stretch the shank.

In another form of the fastener assembly usuable in the described tightening technique, the collar member is an annular member which can be placed ajacent a segment of the threaded portion of the shank. A separate internally threaded nut member can be used to snug the workpieces together and also to lightly clamp the annular member against an outer surface of the adjacent workpiece. Alternatively, the annular member could be placed under the head of the pin member and the threaded portion of the shank could cooperate with a complimentary thread configuration formed in the opening in one of the workpieces to snug the workpieces together and also to lightly clamp the annular member against an outer surface of the adjacent workpiece. Regardless of the location of the annular member, when it is crimped, displaced material flows into intimate engagement with the adjacent segment of the shank and then axially to stretch the shank.

In the forms of the fastener assembly described above, the initial radial flow of displaced collar material is such that it bears tightly against the adjacent segment of the shank. Accordingly, when removing the fasteners from the workpieces, it is necessary to use a vice-like grip on the collar member in order to disengage it from the pin member. If the adjacent segment of the shank is a threaded portion it is not unusual to mar, bend or otherwise damage the thread; if the adjacent segment of the shank is unthreaded, it is not unusual to mar the unthreaded portion and to mar, bend, or otherwise damage the shank. Such damage, of course, limits the reusability of the pin member and a new pin member is required when reassembling the joint. Use of a new pin member is, of course, expensive particularly in aerospace applications where the pin members may be made of exotic alloys.

In addition it should be noted that when the displaced collar material engages the adjacent segment of the shank relatively high forces are developed and are exerted on the shank. These forces can be so high that the shank can be marred, scored or otherwise damaged which in turn weakens the pin member and can lead to premature failure of the joint, particularly in fatigue and particularly if the adjacent segment of the shank is threaded. If the adjacent segment of the shank is threaded, after crimping, the displaced collar material forms an internal thread in the collar which transfers most of the axial load on the joint to the damaged thread on the shank of the pin member. Thus, most of the load on the joint is taken up by a damaged thread on the pin member which increases the likelihood of premature failure.

Accordingly, it is an object of this invention to provide a method of preloading a joint and a fastener assembly usable therein whereby the fastener assembly can be readily removed from the joint without damage and wherein various members of the fastener assembly are reusable.

It is another object of this invention to provide a method of preloading a joint and a fastener assembly usable therein such that various members of the fastener assembly are not damaged and weakened.

It is still another object of this invention to provide a collar member which is crimped to preload a joint without damaging the associated members of the fastener assembly during installation or removal.

Finally, it is an object of this invention to provide a preloaded joint that is economical, easy to assemble and disassemble and which has a high fatigue strength.

These and other objects of this invention are accomplished by providing a fastener assembly including a collar member having a deformable outer portion and a relatively hard inner portion highly resistant to radial deformation and further including a pin having a head and a shank including a threaded portion. The shank of the pin member is placed in aligned openings in a plurality of workpieces and the collar member is placed on the shank so that the inner portion is adjacent a portion of the shank. With the fastener assembly and workpieces thus arranged the fastener assembly is tightened whereby the joint is snugged together with a light preload and, thereafter, the outer portion of the collar is crimped forming a groove configuration in its outer surface. The radial flow of material displaced in the outer portion of the collar member is resisted by the relatively hard inner portion and thus flows axially to stretch the shank of the pin member and exert a preload on the workpieces. The inner portion of the collar member undergoes substantially no inward deformation which would cause it to grip the adjacent shank portion of the pin member.

More particularly, the collar member can be an integrally formed portion of a nut member having an internally threaded portion cooperating with the threaded portion of the shank to snug the joint. Alternatively, the collar member can be an annular member located between a separate nut member and the outer surface of one of the workpieces or, if desired, between the head of the pin member and the outer surface of the adjacent workpiece. If the annular member is located between the head of the pin member and the outer surface of the adjacent workpiece, the threaded portion of the shank could cooperate with an internally threaded hole in another workpiece.

For a better understanding of the invention, reference is made to the following description of several preferred embodiments, taken in conjunction with the figures of the accompanying drawing, in which.

Figure 1:
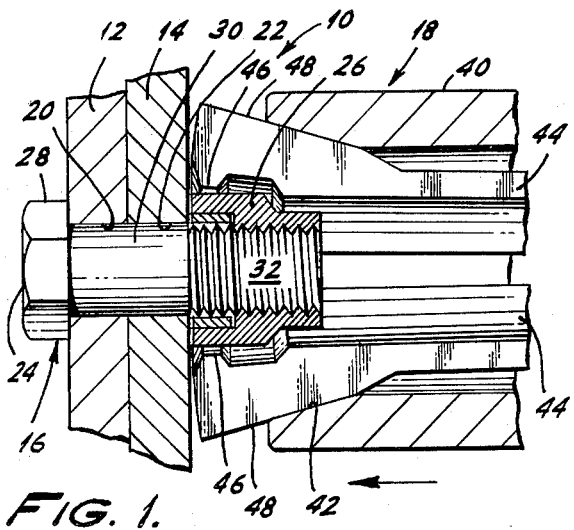
FIG. 1 is a side view partially in section, of a fastener assembly in accordance with a first embodiment of this invention and also showing a crimping tool prior to crimping.
Figure 2:
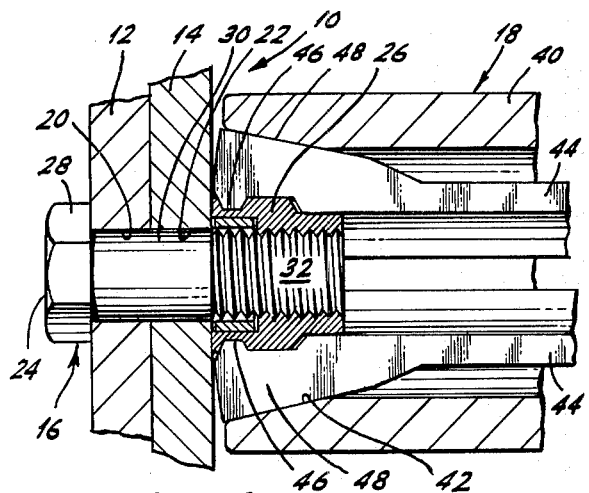
FIG. 2 is a view similar to FIG. 1 with the fastener assembly and crimping tool shown at the completion of the crimping operation.

Referring first to FIGS. 1 and 2 of the drawing, there is illustrated a joint 10 including a plurality of workpieces 12 and 14 and a fastener assembly 16 in accordance with a first embodiment of this invention. Also shown is a portion of a crimping tool 18 which forms no part of this invention. Workpieces 12 and 14 are in face to face abutting relationship and are formed with aligned openings 20 and 22. While only two workpieces are shown it should be understood that any number can be utilized in accordance with this invention.

Fastener assembly 16 includes a pin member 24 and a collar member 26. Pin member 24 can be a conventional bolt including an enlarged head 28 and an axially extending shank 30. Head 28 includes a bearing surface which seats against the outer surface of workpiece 12 in bearing engagement therewith and may be formed with a wrenching configuration. It will be understood from a further description of the invention that a wrenching configuration is not necessary for this embodiment of the invention. Shank 30 extends through aligned openings 20 and 22 in the workpieces and includes a threaded portion 32 extending beyond the outer surface of workpiece 14.

Figure 3:
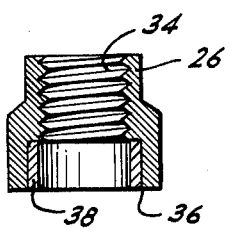
FIG. 3 is a sectional view of a collar member usable with the embodiment of the invention illustrated in FIGS. 1 and 2 and illustrating its configuration prior to crimping.

In this embodiment of the invention, as most clearly seen in FIG. 3 of the drawing collar member 26 includes an outer portion having an internally threaded bore portion 34 and an enlarged counterbored portion 36. The outer surface of collar 26 is formed with a wrenching configuration which may be of any conventional shape and in this embodiment is in the form of a spline configuration which cannot be seen in the section views illustrated in the drawing.

The outer portion of collar member 26 is generally deformable, that is, it can be deformed by generally conventional crimping tools, but is sufficiently hard to withstand normally expected loads on the joint. As an example, the outer portion of collar member 26 can be formed of steel treated to a hardness of about $R_c20$ to about $R_c40$.

Still referring to FIG. 3 of the drawing, it can be seen that collar member 26 also includes an inner portion in the form of a hardened annular insert 38 having an axial length substantially equal to that of counterbored portion 36. The outer diameter of annular insert 38 is just slightly larger than that of counterbored portion 36 so that the insert can be carried in the counterbored portion with a slight interference fit. For purposes to become clear hereafter, the inner diameter of annular insert 38 is just slightly larger than that of shank 30 of the pin member. Annular insert 38 is highly resistive to deformation, that is, is substantially undeformable by generally conventional crimping tools. As an example, insert 38 can also be formed of steel but is treated to have a hardness of about $R_c45$ to $R_c60$.

Referring back to FIG. 1 of the drawing, it can be seen that collar member 26 is placed over shank 30 so that threaded bore portion 34 engages threaded shank portion 32. At this point, one of the fastener members, preferably collar member 26, is rotated so that fastener assembly 16 snugs the joint together, that is, exerts a slight preload on workpieces 12 and 14 so that free play is eliminated from the joint. Depending on the construction of crimping tool 18, it may be used to snug the joint.

While crimping tool 18 forms no part of this invention, it is illustrated to an extent to facilitate an understanding thereof. Crimping tool 18 includes a cylindrical member or barrel 40 having a mouth formed with a tapered wall 42. A crimping collet is located in barrel 40 and includes a plurality of fingers 44 each formed with an arcuate jaw 46. Fingers 44 are normally biased apart as shown in FIG. 1 and are formed with inclined surfaces 48, which are seated against tapered wall 42. Tools of this type are generally well known in the art and, accordingly, a more specific description thereof is not provided in this application.

Figure 4:
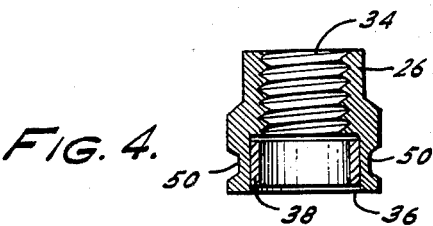
FIG. 4 is a sectional view similar to FIG. 3 and illustrating the configuration of the collar after crimping.

After collar member 26 has been threadably engaged with pin member 24 to snug the joint together, barrel 40 on tool 18 is moved toward the outer surface of workpiece 14 as shown by the arrow in FIG. 1 of the drawing and inclined surface 42 co-acts with inclined surfaces 48 to move fingers 44 and jaws 46 radially inwardly to the position shown in FIG. 2. Jaws 46 exert radially inwardly directed force and form a corresponding groove configuration 50, shown in FIG. 4 of the drawing in the outer portion of collar member 26 adjacent counterbored portion 36 by displacing material surrounding annular insert 38. Radially inward movement of the displaced material is resisted by annular insert 38 which undergoes substantially no radial deformation. Because of the resistance of annular insert 38, displaced material flows axially causing collar member 26 to stretch and react against the outer surface of workpiece 14 and the threaded portion 32 of shank 30. It should be noted and is clearly shown in FIG. 4 of the drawing that annular insert 38 does not stretch and is substantially undeformed in the radial direction. Stretching of collar member 26 causes corresponding stretching of shank 30 because of the threaded engagement between threaded portion 32 and threaded bore 34 and also because of the reaction of the bearing surface of head 28 against the outer surface of workpiece 12. Stretching of shank 30, of course, induces a preload in the joint and it has been found that the amount of load induced can be rather precisely controlled.

In view of the foregoing, it can be seen that displaced collar material does not engage the adjacent segment of threaded shank portion 32. Accordingly, damage of the thread does not occur and collar member 26 can be removed from pin member 24 by a conventional wrench allowing reuse of the pin member.

From the foregoing description, it is seen that collar member 26 must be fabricated from a material which permits axial flow of the collar member material. Depending upon the particular dimensions of collar member 26 and annular insert 38, the hardness differential between the collar member and the annular insert preferably is $R_c15$ or greater.

Figure 5:
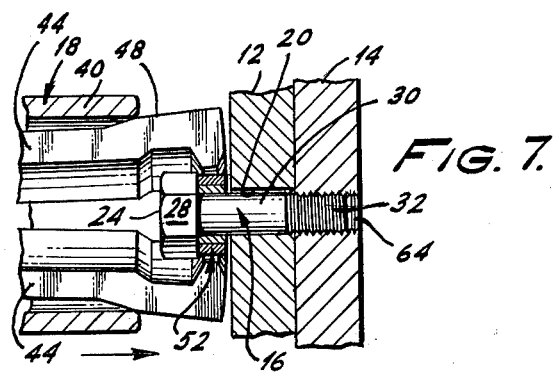
FIG. 5 is a side view partly in section, of another fastener assembly in accordance with this invention including a crimping tool prior to crimping.
Figure 6:
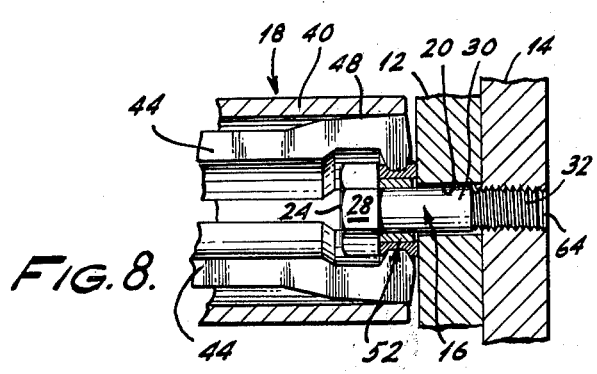
FIG. 6 is a view similar to FIG. 5 with the fastener assembly and crimping tool shown at the completion of the crimping operation.

Referring to FIGS. 5 and 6, a second embodiment of the invention is illustrated and is somewhat similar to the embodiment illustrated in FIGS. 1 and 2 of the drawing. Accordingly, like reference numerals are used for similar parts. As in the embodiment illustrated in FIGS. 1 and 2 of the drawing, the embodiment disclosed in FIGS. 5 and 6 includes a plurality of workpieces 12 and 14 in face to face relationship and having aligned openings 20 and 22 formed therein. Fastener assembly 16 includes a pin member 24 formed with an enlarged head 28 and a shank 30 extending through the aligned openings in the workpieces with a projecting threaded portion 32.

Figure 9:
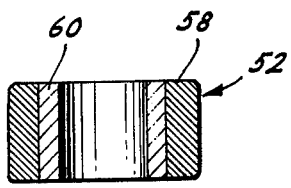
FIG. 9 is a sectional view of a collar member usable with the embodiments of the invention illustrated in FIGS. 5-8 and illustrating its configuration prior to crimping; and, FIG. 10 is a sectional view similar to FIG. 9 and illustrating the configuration of the collar after crimping.

In the embodiment of the invention illustrated in FIGS. 5 and 6 of the drawing collar member 26 has been replaced by an annular collar member 52 and a separate nut member 54, the latter being of generally conventional form and including a threaded bore 56. As best seen in FIG. 9 of the drawing annular member 52 includes an outer portion in the form of an outer annular member 58 having a generally smooth bore and an inner portion in the form of an inner annular member 60 carried in the outer annular member with a slight interference fit and also having a generally smooth bore. As also seen in FIG. 9 of the drawing, members 58 and 60 have substantially the same axial length. Similar to the embodiment of the invention illustrated in FIGS. 1–4 of the drawing, the outer portion of collar member 52, annular member 58, is generally deformable, that is, it can be deformed by generally conventional crimping tools. As an example, annular member 58 can be formed of steel having a hardness of about $R_c20$ to about $R_c40$. Also similar to the embodiment of the invention illustrated in FIGS. 1–4, the inner portion of the collar member 52, annular member 60, is highly resistive to deformation, that is, is substantially undeformable by generally conventional crimping tools. As an example, annular member 60 can be formed of steel having a hardness of about $R_c45$ to $R_c60$.

As shown in FIG. 6, collar member 52 is initially placed over the projecting threaded portion 32 of shank 30 such that the inner surface of annular member 60 surrounds the threaded portion of the shank with one face adjacent the outer surface of workpiece 14. Thereafter, a nut member 54 is threadably engaged with threaded portion 32 to snug the joint together. With the joint snugged together the one face of collar member 52 bears on the outer surface of workpiece 14 and the other face bears on the bearing surface of nut member 54 and the workpieces have been pulled together to eliminate free play in the joint. At this point, crimping tool 18 is utilized to crimp collar member 52 and can be of the type shown in FIGS. 1 and 2 of the drawing. The tool illustrated in FIGS. 5 and 6, however, does not include an inclined surface 42 to demonstrate a different tool usable with this invention.

Figure 10:
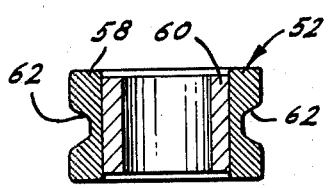

When collar member 52 is crimped, a groove configuration 62 is formed in outer annular member 58, as best seen in FIG. 10 of the drawing and material in the outer annular member is displaced. However, radial flow of the displaced material is resisted by inner annular member 60 so that the displaced material flows primarily in the axial direction causing outer annular member 58 to stretch and react against the outer surface of workpiece 14 and the bearing surface of nut member 54. In FIG. 10 of the drawing it can be seen that while outer annular member 58 stretches, inner annular member 60 does not. Because of the reaction of outer annular member against workpiece 14 and the nut member 54, the stretching of annular member 58 displaces the nut member axially along shank 30 and in a direction away from workpiece 14. As nut member 54 is displaced it stretches shank 30 of pin member 24 because of the threaded engagement of threaded portion 32 and threaded bore 56. Stretching of shank 30, of course, induces a relatively accurate preload in the joint.

In view of the foregoing it can be seen that displaced collar material does not engage the adjacent segment of threaded shank 32 and, thus, will not damage the thread. In addition, removal of nut member 54 can be accomplished by conventional means and removal of collar member 52 can also be readily accomplished without damaging the thread. Moreover, both pin member 24 and nut member 54 are reusable.

Figure 7:
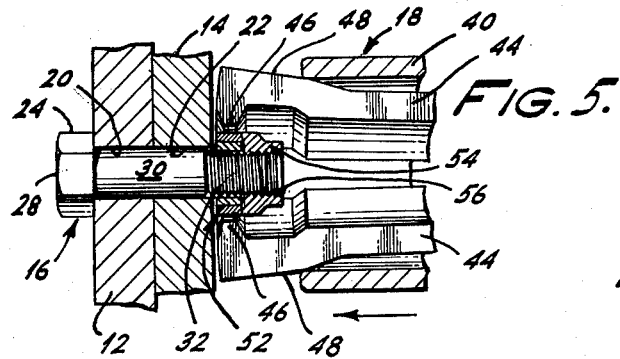
FIG. 7 is a side view partly in section of another fastener assembly in accordance with this invention including a crimping tool prior to crimping.
Figure 8:
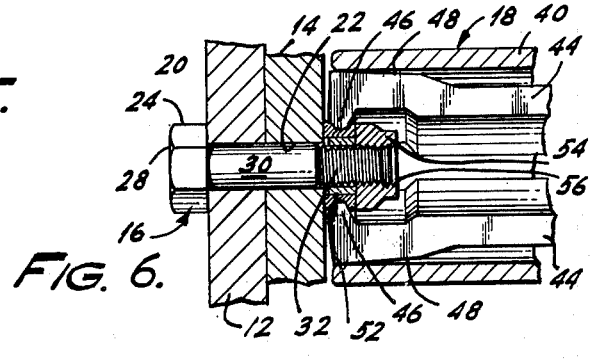
FIG. 8 is a view similar to FIG. 7 with the fastener assembly and crimping tool shown at the completion of the crimping operation.

Finally, a third embodiment of the invention is illustrated in FIGS. 7 and 8 which is generally similar to the embodiment illustrated in FIGS. 5 and 6. Accordingly, like reference numerals will be used for similar parts. In this embodiment collar 52 is placed under the head 28 of pin member 24 such that it surrounds a segment of shank portion 30 and bears on the bearing surface of the pin member and the outer surface of workpiece 12. With this arrangement, nut member 54 can be eliminated from the fastener assembly and workpiece 14 can be formed with a threaded opening 64 that cooperates with threaded portion 32 on pin member 24 to snug the joint and also to provide a reaction surface for stretching shank 30 during the crimping operation. It should be understood, however, that threaded portion 32 could project beyond the outer face of workpiece 14 and cooperate with a conventional nut member. Similar to the previously described embodiments, once the joint has been snugged together, a crimping tool 18 is utilized to crimp the collar causing axial flow of the collar material to preload the joint in a manner previously described except that as collar member 52 stretches it reacts against the bearing face of head 28 and the outer surface of workpiece 12.

While in the foregoing, there have been described certain preferred embodiments of the invention, it should be realized that various changes and modifications can be made without departing from the true spirit and scope of the invention as recited in the appended claims.

I claim:

1. A selectively reusable fastener assembly for preloading a joint assembly including a plurality of workpieces having aligned openings formed therein, said fastener assembly including a pin member having an enlarged head and a shank projecting therefrom with a threaded portion thereon, said shank being adapted to be located in said aligned openings, said fastener assembly further including a removable collar member having a deformable outer portion and a relatively hard inner portion including an inner surface, said inner portion being substantially undeformable in a radial direction, said collar member being placed about a portion of said shank and crimped by a radially acting force which displaces material in said outer portion, said inner portion resisting radially inward flow of said displaced material and causing said displaced material to flow axially causing said outer portion of said collar member to elongate and preload the joint, said inner surface being spaced from said shank before and after deformation of said outer portion, whereby said collar member is removable from said pin member after crimping.

2. A fastener assembly in accordance with claim 1 wherein said outer portion of said collar member is in the form of a first annular member and wherein said inner portion of said collar member is in the form of a second annular member carried in said first annular member.

3. A fastener assembly in accordance with claim 2 wherein said first annular member is integrally formed with and adjacent to a threaded portion.

4. A fastener assembly in accordance with claim 1 wherein the hardness of said outer portion is between approximately $R_c20$ to $R_c40$, and the hardness of said inner portion is between approximately $R_c45$ to $R_c60$.

5. A fastener in accordance with claim 1 wherein the hardness differential between said deformable outer portion and said inner portion is at least approximately $R_c15$.

* * * * *